US011526279B2

(12) United States Patent
Kwok et al.

(10) Patent No.: US 11,526,279 B2
(45) Date of Patent: Dec. 13, 2022

(54) TECHNOLOGIES FOR PERFORMING COLUMN ARCHITECTURE-AWARE SCRAMBLING

(71) Applicant: Intel Corporation, Santa Clara, CA (US)

(72) Inventors: Zion Kwok, Vancouver (CN); Jawad Khan, Portland, OR (US); Richard Coulson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 107 days.

(21) Appl. No.: 15/930,035

(22) Filed: May 12, 2020

(65) Prior Publication Data
US 2020/0272340 A1 Aug. 27, 2020

(51) Int. Cl.
*G06F 3/06* (2006.01)
*G06F 7/72* (2006.01)

(52) U.S. Cl.
CPC .......... *G06F 3/0616* (2013.01); *G06F 3/0659* (2013.01); *G06F 3/0673* (2013.01); *G06F 7/724* (2013.01)

(58) Field of Classification Search
CPC .................................................. G06F 3/0616
See application file for complete search history.

(56) References Cited

U.S. PATENT DOCUMENTS

| | | | | |
|---|---|---|---|---|
| 6,222,762 B1* | 4/2001 | Guterman | ........... | G11C 11/5621 257/E27.103 |
| 9,158,672 B1* | 10/2015 | Zheng | ................. | G06F 12/0246 |
| 9,442,839 B1* | 9/2016 | Sharma | ................. | G11C 29/765 |
| 10,417,122 B2* | 9/2019 | Lien | ..................... | G06F 12/0246 |
| 2005/0104116 A1* | 5/2005 | Chen | ................. | H01L 27/11521 257/315 |
| 2009/0323942 A1 | 12/2009 | Sharon et al. | | |
| 2011/0161784 A1* | 6/2011 | Selinger | .............. | G06F 11/1016 714/768 |
| 2012/0005455 A1* | 1/2012 | Ueda | ..................... | G06F 7/584 711/217 |
| 2012/0265928 A1 | 10/2012 | Mun et al. | | |
| 2013/0018934 A1 | 1/2013 | Kim et al. | | |

(Continued)

FOREIGN PATENT DOCUMENTS

WO 2009088920 7/2009

OTHER PUBLICATIONS

European Search Report for EPO Patent Application No. 20216294.7, dated Jun. 18, 2021, 300 pages.

*Primary Examiner* — Douglas King
(74) *Attorney, Agent, or Firm* — Jordan IP Law, LLC

(57) ABSTRACT

Technologies for scrambling functions in a column-addressable memory architecture includes a device having a memory and a circuitry. The memory includes a matrix storing individually addressable bit data, and the matrix is formed by rows and columns. The circuitry is to receive a request to perform a write operation of one or more bit values to one of the columns. The circuitry is further to determine a scrambler state at each location of the column, the location corresponding to a respective row and column index. The scrambler state is indicative of a function used to determine a value at the respective column location. Each of the bit values is scrambled as a function of the scrambler state for the respective column location and written thereto.

18 Claims, 7 Drawing Sheets

(56) References Cited

U.S. PATENT DOCUMENTS

| | | |
|---|---|---|
| 2016/0196076 A1* | 7/2016 | Oh ........................ G06F 3/0644 |
| | | 711/103 |
| 2016/0321000 A1 | 11/2016 | Tuers et al. |
| 2017/0090764 A1* | 3/2017 | Lien ........................ G06F 21/79 |
| 2018/0074791 A1 | 3/2018 | Atsumi et al. |
| 2019/0227808 A1 | 7/2019 | Khan et al. |

* cited by examiner

TECHNOLOGIES FOR PERFORMING COLUMN ARCHITECTURE-AWARE SCRAMBLING

BACKGROUND

Scrambling is a preprocessing function that memory architectures use to write data to a device. Similarly, in such a scheme, memory architectures apply a descrambling function on the data prior to outputting data in response to a read request. In bit-addressable memory architectures, these techniques are useful in ensuring that the amount of 0's and 1's written to memory is relatively even, and that the amount of bits that flip on each write operation is also relatively even. Doing so results in even power consumption and heating on the device and provides for relatively even wear on individual bit locations over time.

However, typical scrambling schemes often default to a row-based scrambling. That is, a given row is associated with a given scrambler state, such that I/O operations are scrambled (or descrambled) according to that state. This presents a challenge for memory architectures adapting column-based I/O operations because each location in the column is associated with a different scrambler state from one another.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
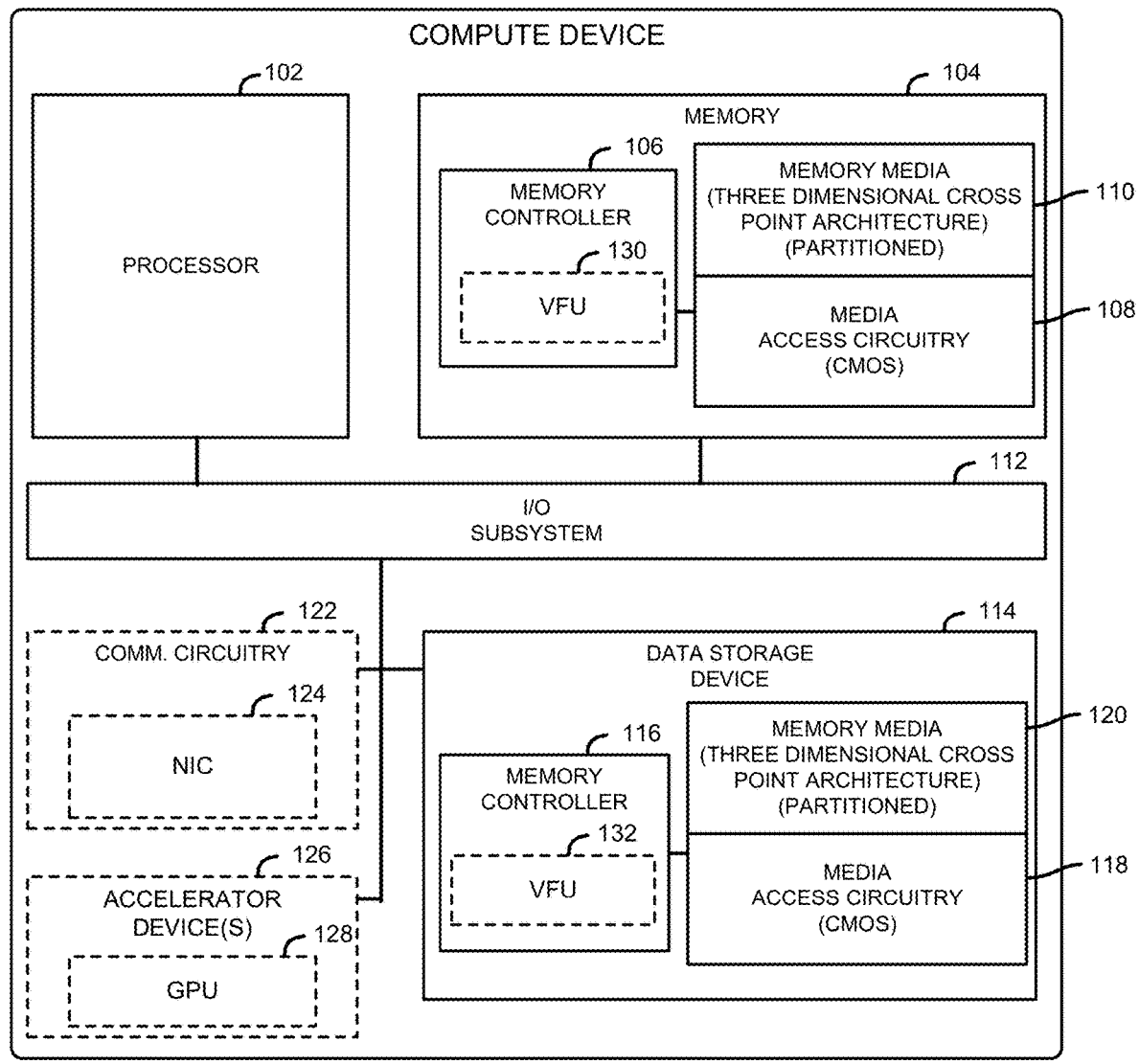
FIG. 1 is a simplified diagram of at least one embodiment of a compute device for performing column architecture-aware scrambling on data.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a compute device 100 for performing column architecture-aware scrambling on data includes a processor 102, a memory 104, an input/output (I/O) subsystem 112, a data storage device 114, communication circuitry 122, and one or more accelerator devices 126. Of course, in other embodiments, the compute device 100 may include other or additional components, such as those commonly found in a computer (e.g., a display, peripheral devices, etc.). Additionally, in some embodiments, one or more of the illustrative components may be incorporated in, or otherwise form a portion of, another component. The term "memory," as used herein, may refer to the memory 104 and/or the data storage device 114, unless otherwise specified. As explained in more detail herein, media access circuitry 108, 118 (e.g., any circuitry or device configured to access and operate on data in the corresponding memory media 110, 120) connected a corresponding memory media 110, 120 (e.g., any device or material that data is written to and read from) may access (e.g., read) individual columns (e.g., bits) of rows of data (e.g., vectors), such as for use in performing similarity searches, also referred to as "stochastic associative searches" (SAS). As such, the memory may operate as a "stochastic associative memory" (e.g., is designed to enable the efficient performance of stochastic associative searches).

The memory media 110, in the illustrative embodiment, has a three dimensional cross point architecture that has data access characteristics that differ from other memory architectures (e.g., dynamic random access memory (DRAM)), such as enabling access to one bit per tile and incurring time delays between reads or writes to the same partition or other partitions. The media access circuitry 108 is configured to make efficient use (e.g., in terms of power usage and speed) of the architecture of the memory media 110, such as by accessing multiple tiles in parallel within a given partition. In some embodiments, the media access circuitry 108 may utilize scratch pads (e.g., relatively small, low latency memory) to temporarily retain and operate on data read from the memory media 110 and broadcast data read from one partition to other portions of the memory 104 to enable calculations (e.g., matrix operations) to be performed in parallel within the memory 104. Additionally, in the illustrative embodiment, instead of sending read or write requests to the memory 104 to access matrix data, the processor 102 may send a higher-level request (e.g., a request for a macro operation, such as a request to return a set of N search results based on a search key). As such, many compute operations, such as artificial intelligence operations (e.g., stochastic associative searches) can be performed in memory (e.g., in the memory 104 or in the data storage device 114), with minimal usage of the bus (e.g., the I/O subsystem 112) to transfer data between components of the compute device 100 (e.g., between the memory 104 or data storage device 114 and the processor 102).

In some embodiments the media access circuitry 108 is included in the same die as the memory media 110. In other embodiments, the media access circuitry 108 is on a separate die but in the same package as the memory media 110. In yet other embodiments, the media access circuitry 108 is in a separate die and separate package but on the same dual in-line memory module (DIMM) or printed circuit board as the memory media 110.

The processor 102 may be embodied as any device or circuitry (e.g., a multi-core processor(s), a microcontroller, or other processor or processing/controlling circuit) capable of performing operations described herein, such as executing an application (e.g., an artificial intelligence related application that may utilize stochastic associative searches). In some embodiments, the processor 102 may be embodied as, include, or be coupled to a field-programmable gate array (FPGA), an application specific integrated circuit (ASIC), reconfigurable hardware or hardware circuitry, or other specialized hardware to facilitate performance of the functions described herein.

The memory 104, which may include a non-volatile memory (e.g., a far memory in a two-level memory scheme), includes the memory media 110 and the media access circuitry 108 (e.g., a device or circuitry, such as a processor, application specific integrated circuitry (ASIC), or other integrated circuitry constructed from complementary metal-oxide-semiconductors (CMOS) or other materials) underneath (e.g., at a lower location) and coupled to the memory media 110. The media access circuitry 108 is also connected to the memory controller 106, which may be embodied as any device or circuitry (e.g., a processor, a co-processor, dedicated circuitry, etc.) configured to selectively read from and/or write to the memory media 110 in response to corresponding requests (e.g., from the processor 102 which may be executing an artificial intelligence related application that relies on stochastic associative searches to recognize objects, make inferences, and/or perform related artificial intelligence operations). In some embodiments, the memory controller 106 may include a vector function unit (VFU) 130 which may be embodied as any device or circuitry (e.g., dedicated circuitry, reconfigurable circuitry, an application specific integrated circuit (ASIC), a field programmable gate array (FPGA), etc.) capable of offloading vector-based tasks from the processor 102 (e.g., comparing data read from specific columns of vectors stored in the memory media 110, determining Hamming distances between the vectors stored in the memory media 110 and a search key, sorting the vectors according to their Hamming distances, etc.).

Figure 2:
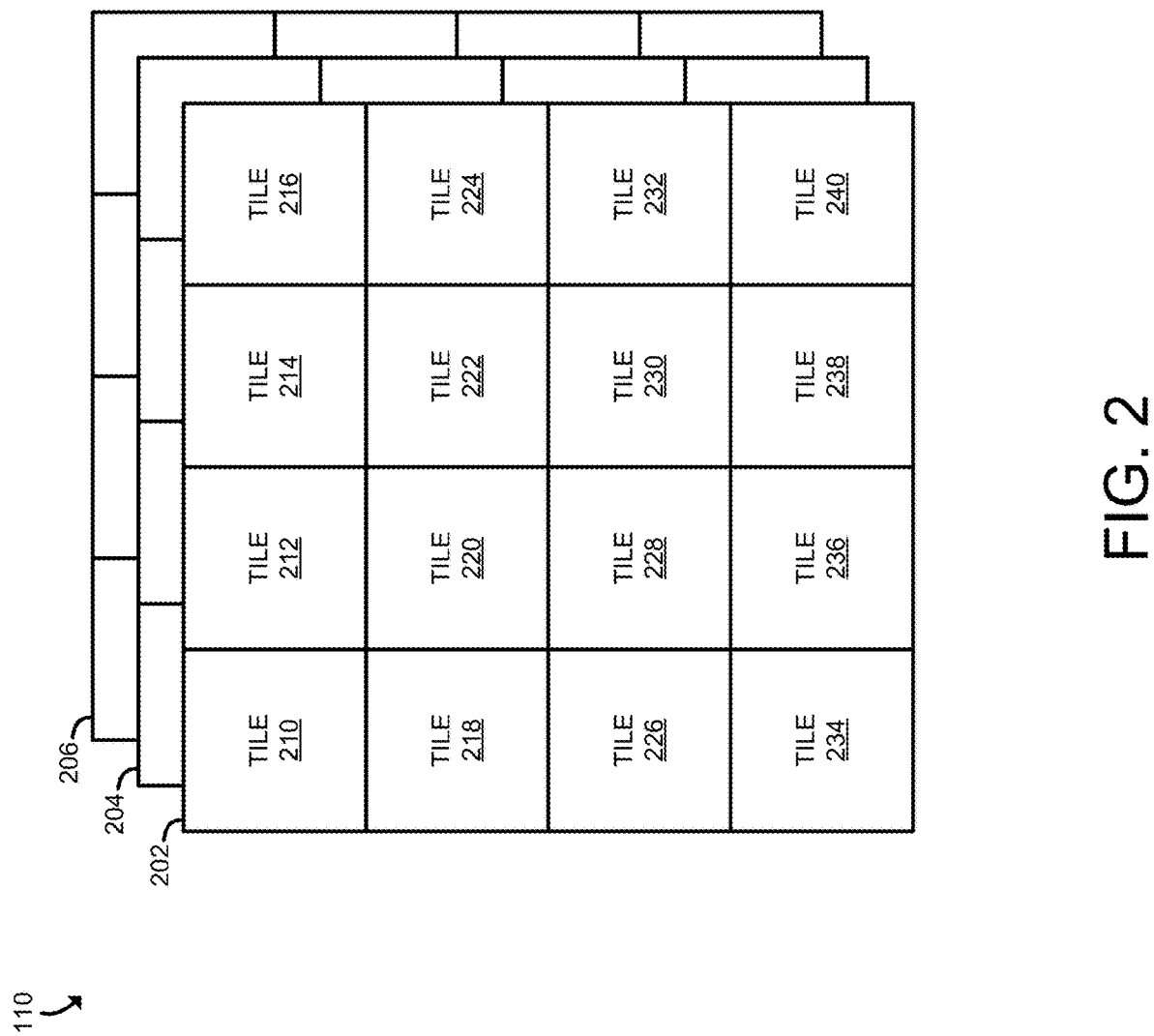
FIG. 2 is a simplified diagram of at least one embodiment of a memory media included in the compute device of FIG. 1.

Referring briefly to FIG. 2, the memory media 110, in the illustrative embodiment, includes a tile architecture, also referred to herein as a cross point architecture (e.g., an architecture in which memory cells sit at the intersection of word lines and bit lines and are individually addressable and in which bit storage is based on a change in bulk resistance), in which each memory cell (e.g., tile) 210, 212, 214, 216, 218, 220, 222, 224, 226, 228, 230, 232, 234, 236, 238, 240 is addressable by an x parameter and a y parameter (e.g., a column and a row). The memory media 110 includes multiple partitions, each of which includes the tile architecture. The partitions may be stacked as layers 202, 204, 206 to form a three dimensional cross point architecture (e.g., Intel 3D XPoint™ memory). Unlike typical memory devices, in which only fixed-size multiple-bit data structures (e.g., byte, words, etc.) are addressable, the media access circuitry 108 is configured to read individual bits, or other units of data, from the memory media 110 at the request of the memory controller 106, which may produce the request in response to receiving a corresponding request from the processor 102.

Referring back to FIG. 1, the memory 104 may include non-volatile memory and volatile memory. The non-volatile memory may be embodied as any type of data storage capable of storing data in a persistent manner (even if power is interrupted to the non-volatile memory). For example, the non-volatile memory may be embodied as one or more non-volatile memory devices. The non-volatile memory devices may include one or more memory devices configured in a cross point architecture that enables bit-level addressability (e.g., the ability to read from and/or write to individual bits of data, rather than bytes or other larger units of data), and are illustratively embodied as three dimensional (3D) cross point memory. In some embodiments, the non-volatile memory may additionally include other types of memory, including any combination of memory devices that use chalcogenide phase change material (e.g., chalcogenide glass), ferroelectric transistor random-access memory (Fe-TRAM), nanowire-based non-volatile memory, phase change memory (PCM), memory that incorporates memristor technology, Magnetoresistive random-access memory (MRAM) or Spin Transfer Torque (STT)-MRAM. The volatile memory may be embodied as any type of data storage capable of storing data while power is supplied volatile memory. For example, the volatile memory may be embodied as one or more volatile memory devices, and is periodically referred to hereinafter as volatile memory with the understanding that the volatile memory may be embodied as other types of non-persistent data storage in other embodiments. The volatile memory may have an architecture that enables bit-level addressability, similar to the architecture described above.

The processor 102 and the memory 104 are communicatively coupled to other components of the compute device 100 via the I/O subsystem 112, which may be embodied as circuitry and/or components to facilitate input/output operations with the processor 102 and/or the main memory 104 and other components of the compute device 100. For example, the I/O subsystem 112 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 112 may form a portion of a system-on-a-chip (SoC) and be incorporated, along with one or more of the processor 102, the main memory 104, and other components of the compute device 100, in a single chip.

The data storage device 114 may be embodied as any type of device configured for short-term or long-term storage of data such as, for example, memory devices and circuits, memory cards, hard disk drives, solid-state drives, or other data storage device. In the illustrative embodiment, the data storage device 114 includes a memory controller 116, similar to the memory controller 106, memory media 120 (also referred to as "storage media"), similar to the memory media 110, and media access circuitry 118, similar to the media access circuitry 108. Further, the memory controller 116 may also include a vector function unit (VFU) 132 similar to the vector function unit (VFU) 130. The data storage device 114 may include a system partition that stores data and firmware code for the data storage device 114 and one or more operating system partitions that store data files and executables for operating systems.

The communication circuitry 122 may be embodied as any communication circuit, device, or collection thereof, capable of enabling communications over a network between the compute device 100 and another device. The communication circuitry 122 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 122 includes a network interface controller (NIC) 124, which may also be referred to as a host fabric interface (HFI). The NIC 124 may be embodied as one or more add-in-boards, daughter cards, network interface cards, controller chips, chipsets, or other devices that may be used by the compute device 100 to connect with another compute device. In some embodiments, the NIC 124 may be embodied as part of a system-on-a-chip (SoC) that includes one or more processors, or included on a multichip package that also contains one or more processors. In some embodiments, the NIC 124 may include a local processor (not shown) and/or a local memory (not shown) that are both local to the NIC 124. In such embodiments, the local processor of the NIC 124 may be capable of performing one or more of the functions of the processor 102. Additionally or alternatively, in such embodiments, the local memory of the NIC 124 may be integrated into one or more components of the compute device 100 at the board level, socket level, chip level, and/or other levels. The one or more accelerator devices 126 may be embodied as any device(s) or circuitry capable of performing a set of operations faster than the general purpose processor 102. For example, the accelerator device(s) 126 may include a graphics processing unit 128, which may be embodied as any device or circuitry (e.g., a co-processor, an ASIC, reconfigurable circuitry, etc.) capable of performing graphics operations (e.g., matrix operations) faster than the processor 102.

Figure 3:
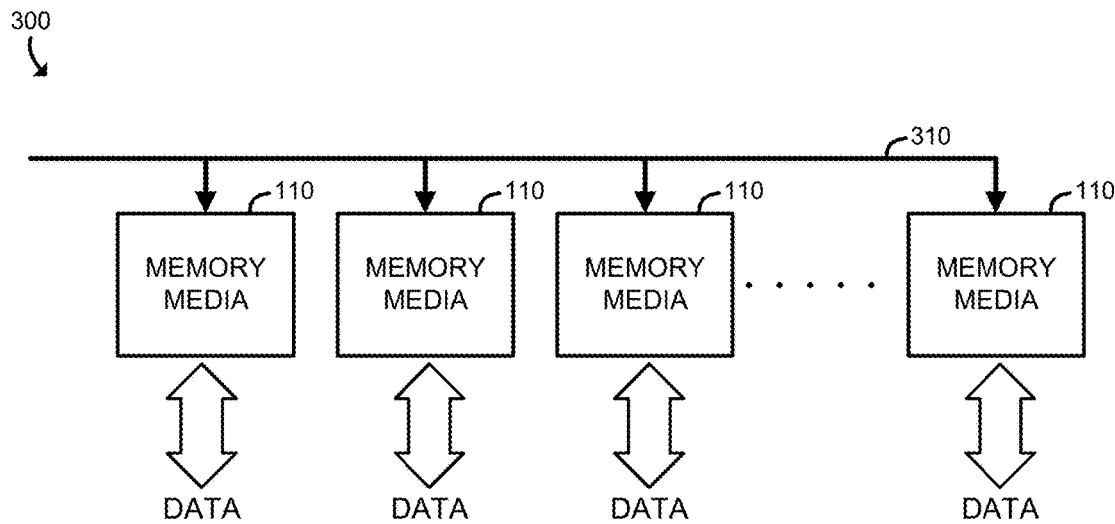
FIG. 3 is a simplified diagram of at least on embodiment of the memory media of the compute device of FIG. 1 in a dual in-line memory module (DIMM)

Referring now to FIG. 3, the compute device 100, in some embodiments, may utilize a dual in-line memory module (DIMM) architecture 300. In the architecture 300, multiple dies of the memory media 110 are connected with a shared command address bus 310. As such, in operation, data is read out in parallel across all of the memory media 110 connected to the shared command address bus 310. Data may be laid out across the memory media 110 in a configuration to allow reading the same column across all of the connected dies of the memory media 110.

Further, generally, prior to being written to the memory media 110, the data may be scrambled using a scrambling logic (e.g., residing in the memory controller 106, media access circuitry 108, inside memory of an accelerator device attached to a CXL bus, etc.) of the device 100. Doing so ensures that the number of 0's and number of 1's written to the memory media 110 are relatively even for level power consumption and reduction of wear in the memory 104. When the data is read out from the memory media 110, such as part of a stochastic associative search, the data is descrambled via a descrambling logic.

Figure 4:
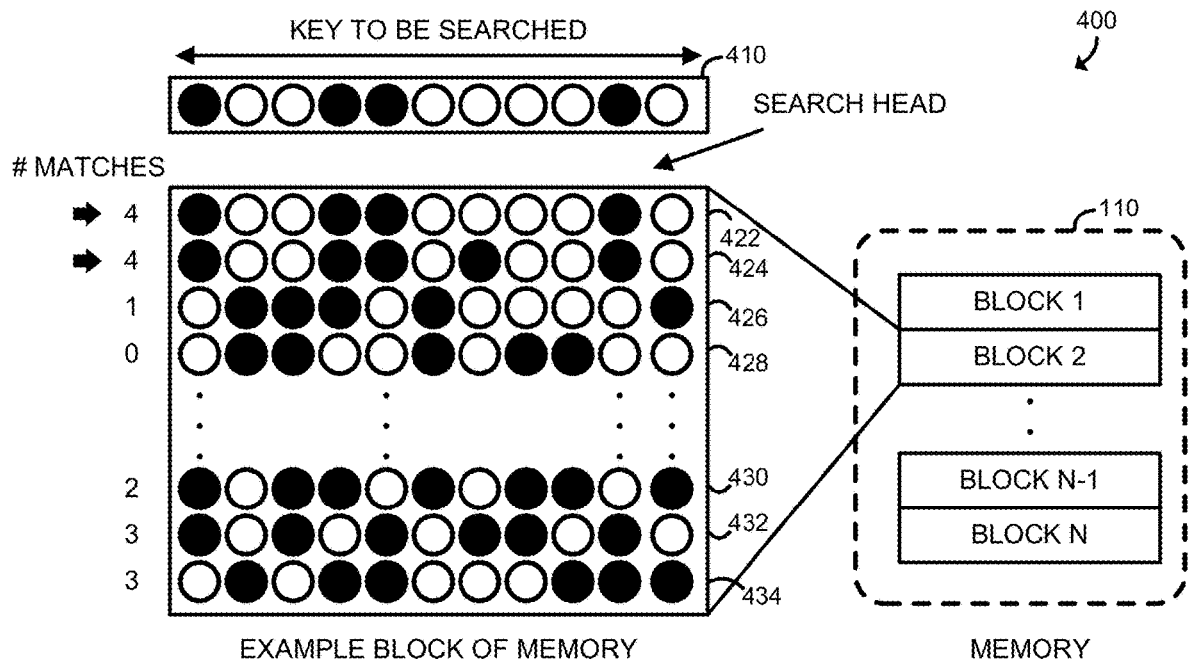
FIG. 4 is a simplified diagram of a stochastic associative search (SAS) performed using a search key on the memory media of FIGS. 1-3.

Referring now to FIG. 4, the compute device 100 may perform a stochastic associative search 400, which is a highly efficient and fast way of searching through a large database of records and finding similar records to a given query record (key). For simplicity and clarity, stochastic associative searches 400, scrambling and descrambling functions, and other processes are described herein as being performed with the memory 104. However, it should be understood that the processes could alternatively or additionally be performed with the storage device 114, depending on the particular embodiment. Given that the memory media 110 allows both row and column-wise reads with similar read latency, the memory media 110 is particularly suited to enabling efficient stochastic associative searches. In performing a search, values within the search key 410 are compared to the corresponding values in the database elements (e.g., vectors) 422, 424, 426, 428, 430, 432, 434 stored in the blocks of the memory media 110. The compute device 100 determines the number of matching values between the search key 410 and each database element (e.g., vector), which is representative of a Hamming distance between the search key 410 and each database element (e.g., vector). The database elements (e.g., vectors) having the greatest number of matches (e.g., lowest Hamming distance) are the most similar results (e.g., the result set) for the stochastic associative search 400.

As stated, the data is generally scrambled prior to being written to the memory media 114. Each individual bit location in the memory media 110 may be associated with a scrambling state, which is indicative of a pattern used to scramble a bit value at that location. Typically, data is scrambled according to a row-based algorithm, and as such, a default way to read from a column would be to use a row-based descrambling algorithm on each bit in the column. However, with each execution of the algorithm, only one individual bit may be output at a time. Because this is time-consuming and generally inefficient, a column-aware scrambling and descrambling approach is desired.

Embodiments presented herein disclose a column-aware scrambling logic that works in row and column direction in the memory media 114. As further described herein, a scrambling pattern of each bit in the memory media 114 is selected as a linear function (e.g., a linear-feedback shift register (LFSR) function) of the row and column indices. Further, a specialized circuit in the memory controller 106 or the media access circuitry 108 may directly advance the state of the scrambler to any row and column. Any scrambler that implements a linear function may be used to compute the scrambling pattern for the column. Advantageously, the techniques described herein allow scrambling and descrambling data in columns to occur without executing row-based scrambling algorithms per entry in a given column, e.g., any requested column may be read or written to more relatively quickly.

Figure 5:
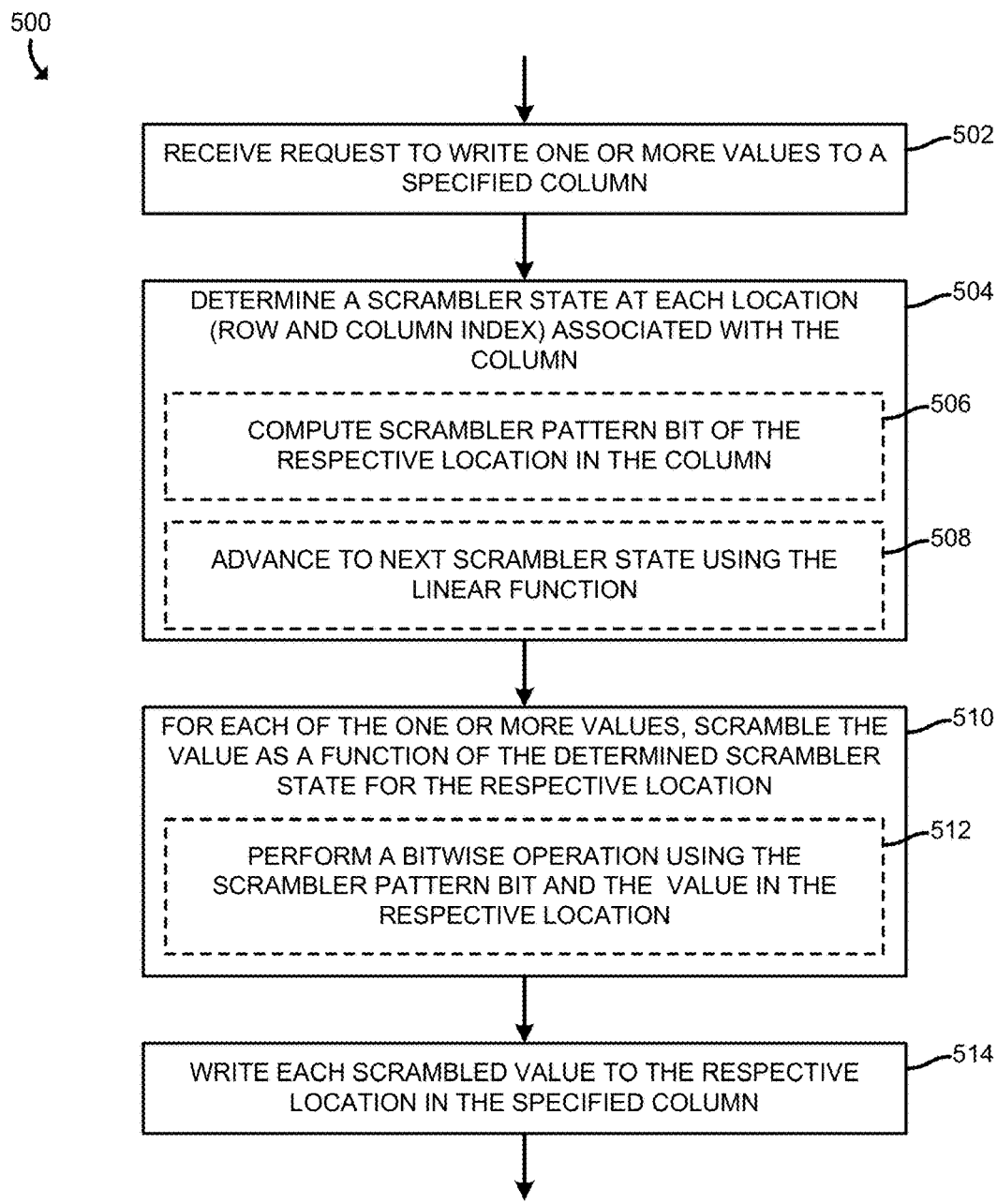
FIG. 5 is a flow diagram of at least one embodiment of a method for performing a scrambling function during a write operation by the compute device of FIG. 1.

Referring now to FIG. 5, a method 500 for performing a write operation using the scrambling techniques further described herein is shown. Although the steps shown are described relative to the memory 104 (e.g., via the memory controller 106 or the media access circuitry 108), these steps are generally applicable to any crosspoint architecture and therefore may also be carried out, for example, in the data storage device 114. As shown, the method 500 begins in block 502, in which the compute device 100, e.g., via the memory 104, receives a request to perform a write operation of one or more bit values to the memory media 110. The request may specify a column address in the memory media 110.

In block 504, the compute device 100 determines a scrambler state at each location associated with the destination column. Particularly, a location corresponds to a specific row and column index associated with the destination column. Further, a scrambler state is indicative of a pattern state (e.g., an 8-bit pattern, 32-bit pattern, etc.) used to determine a pattern bit used in calculating a scramble value for that location (e.g., by a bitwise exclusive-OR operation of the pattern bit with the data bit to be written to that location). The compute device 100 may determine the scrambler state using a linear function of the respective location in the column. An example of such a linear function is a Galois LFSR function using some non-zero initial state.

For example, in block 506, the compute device 100 may compute a pattern bit using a consistent function. For example, the compute device 100 may use a lookup table having arbitrary entries using the state as input and the pattern bit as output.

For instance, consider a logical arrangement of rows and columns of bits in the memory media 114, in which each bit is labeled as (row index, column index):

| 0, 0 | 0, 1 | 0, 2 | 0, 3 | 0, 4 | ... |
| 1, 0 | 1, 1 | 1, 2 | 1, 3 | 1, 4 | ... |
| 2, 0 | 2, 1 | 2, 2 | 2, 3 | 2, 4 | ... |
| 3, 0 | 3, 1 | 3, 2 | 3, 3 | 3, 4 | ... |
| 4, 0 | 4, 1 | 4, 2 | 4, 3 | 4, 4 | ... |
| 5, 0 | 5, 1 | 5, 2 | 5, 3 | 5, 4 | ... |

Each bit may be scrambled above by performing a bitwise exclusive-OR (XOR) operation with a scrambler pattern bit. During a read operation, the data can be recovered by performing a XOR operation with the same scrambler pattern bit.

A given scrambler state may be determined for each bit as a value of a given bit-size, such as 8- or 32-bits, as S(r,c). From S(r,c), a bit 0 of the state is taken as f(r,c) and used a scrambler pattern mask for a bit value, in which f(r,c) is equal to F(S(r,c)) where F(x) is a linear or non-linear function. A scrambler state for each bit location is depicted in abstract below:

| S(0, 0) | S(0, 1) | S(0, 2) | S(0, 3) | S(0, 4) | ... |
| S(1, 0) | S(1, 1) | S(1, 2) | S(1, 3) | S(1, 4) | ... |
| S(2, 0) | S(2, 1) | S(2, 2) | S(2, 3) | S(2, 4) | ... |
| S(3, 0) | S(3, 1) | S(3, 2) | S(3, 3) | S(3, 4) | ... |
| S(4, 0) | S(4, 1) | S(4, 2) | S(4, 3) | S(4, 4) | ... |
| S(5, 0) | S(5, 1) | S(5, 2) | S(5, 3) | S(5, 4) | ... |

The scrambler pattern bit may be determined based on a function of the row and column, notated as f(r, c), depicted in the table below:

| f(0, 0) | f(0, 1) | f(0, 2) | f(0, 3) | f(0, 4) | ... |
| f(1, 0) | f(1, 1) | f(1, 2) | f(1, 3) | f(1, 4) | ... |
| f(2, 0) | f(2, 1) | f(2, 2) | f(2, 3) | f(2, 4) | ... |
| f(3, 0) | f(3, 1) | f(3, 2) | f(3, 3) | f(3, 4) | ... |
| f(4, 0) | f(4, 1) | f(4, 2) | f(4, 3) | f(4, 4) | ... |
| f(5, 0) | f(5, 1) | f(5, 2) | f(5, 3) | f(5, 4) | ... |

In block 508, the compute device 100 may advance to the next scrambler state using the linear function by one step (or by j steps). When moving across a row, the state S(r,c) can be updated to S(r, c+1) by advancing the LFSR by one step. The LFSR may also shift by j steps if needed. To do so, the compute device 100 may rotate the state bits to the right and perform an XOR operation with the state bits and a state bit 0, based on a LFSR polynomial. Such approach may be applicable for all row and column indices. For example, a S(r, c+j) may be determined by rotating S(r, c) and performing an XOR operation on the state bit 0 based on the LFSR polynomial for j. A row may have data bits that are scrambled in sequence. The next row may start with the k-th state of the scrambler logic and continue (e.g., S(r+1, c) equals S(r, c+k). Consequently, when advancing down the column from one row to the next row, the state may be advanced by k steps. A step may be regarded as a multiplication of a square matrix by a column vector. Assume that A represents a Matrix, s=S(r, c) is a current LFSR state, and n=S(r, c+1) is the next LFSR state). The compute device 100 may jump N steps by multiplying by A raised to the power N ($A^N$). In practice, A is a relatively sparse matrix, but because both A and $A^N$ are square matrices with the same dimensions, the hardware requirements for $A^N$ saturates quickly for arbitrarily large values of N.

Assume that $A^0$ is identical to an identity matrix I. The compute device 100 may calculate an $A^{2j}$ by multiplying $A^j$ and $A^j$ for any j. Further, the compute device 100 may jump an arbitrary N steps by multiplying the current state s by $A^1$, $A^2, A^4, A^8, \ldots A^{128}$ while selecting whether to multiply each term based on the bits in the binary representation of N.

Figure 7:
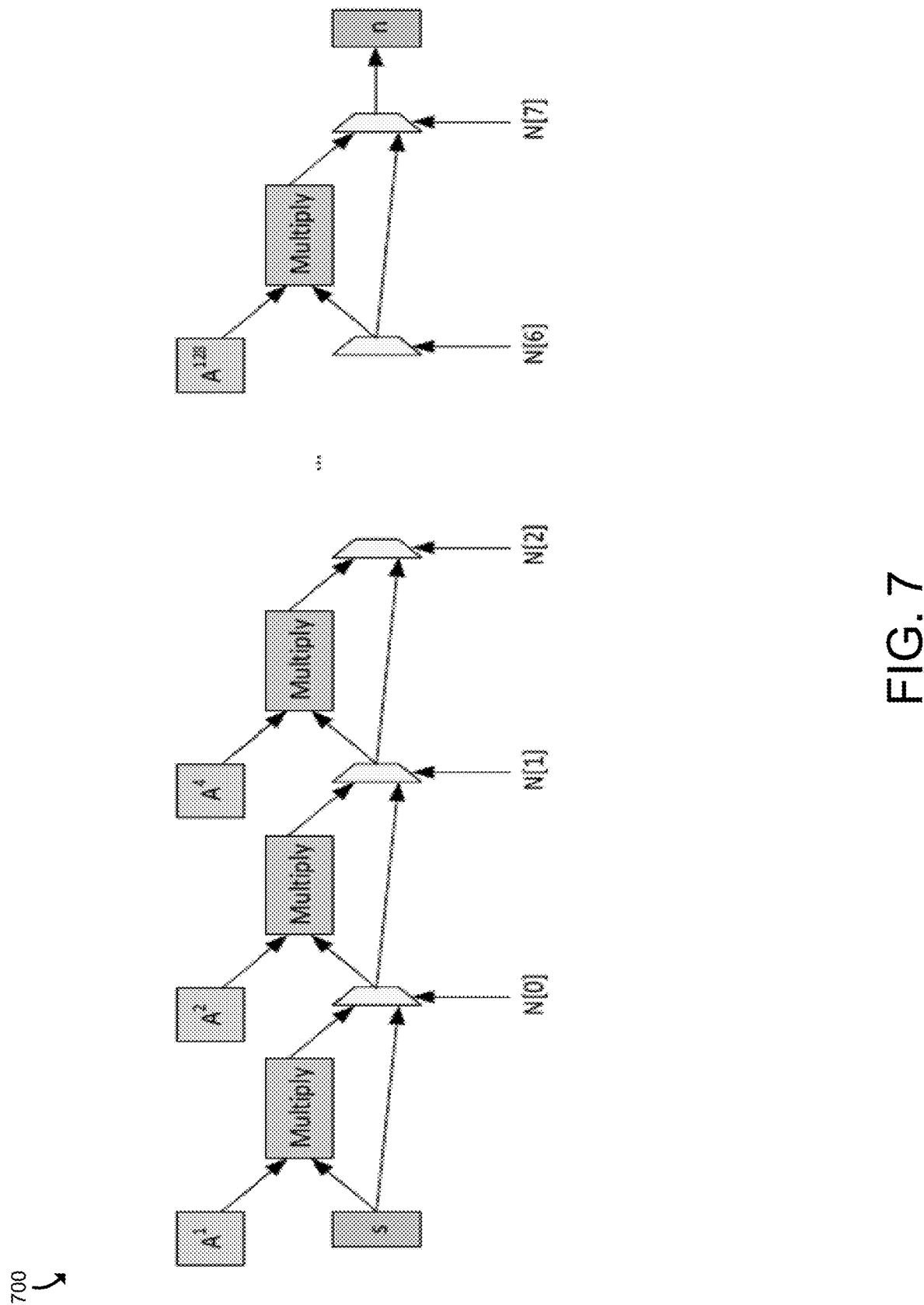
FIG. 7 is a conceptual diagram of a technique for calculating an arbitrary power of a value with a series of multipliers that may be used by the compute device of FIG. 1 to determine a scrambling state of a location in a column.
Figure 8:
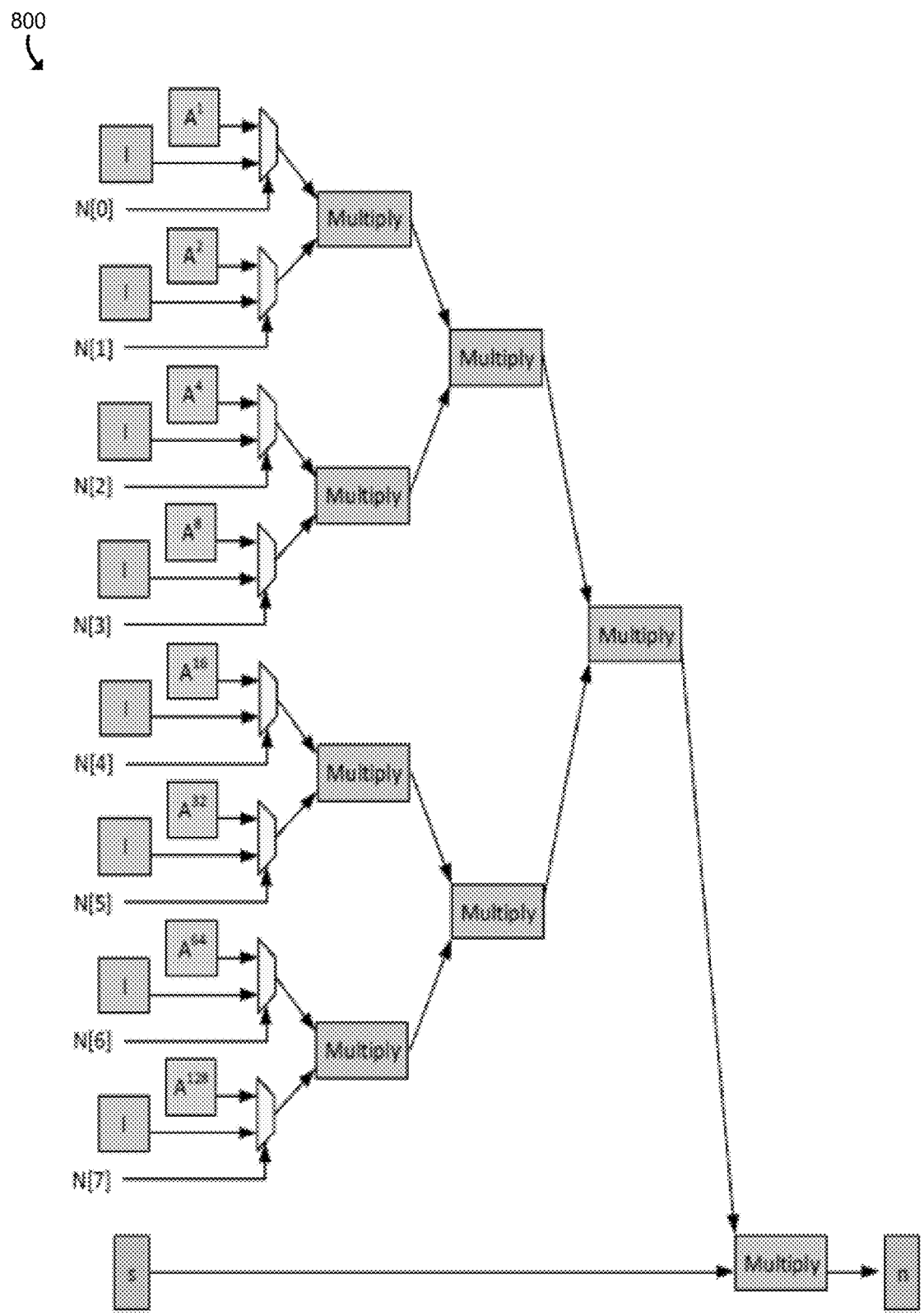
FIG. 8 is a conceptual diagram of a technique for calculating an arbitrary power of a value with a tree structure of multipliers that may be used by the compute device of FIG. 1 to determine a scrambling state of a location in a column.

Doing so can be accomplished by performing a series of multiplications or doing so using a tree of multiplications. Turning briefly to FIG. 7, a diagram 700 of performing a series of multiplications to calculate a new state by multiplying the current state by an arbitrary power of A is shown. And turning briefly to FIG. 8, a diagram 800 of calculating the arbitrary power of A using a tree of multiplications is shown. Using a series approach (as illustrated in FIG. 7) may allow the compute device 100 to perform multiplications over multiple clock cycles to reduce overall gate count compared to the tree of multiplications approach (as illustrated in FIG. 8). However, each embodiment may be used to achieve the effect of column-aware scrambling. The circuits depicted in either diagram 700 or 800 may be used to calculate $A^c$ for an arbitrary column c.

Returning to FIG. 5, in block 510, the compute device 100, for each of the one or more values, scrambles the value as a function of the determined scrambler state for the respective column location. For instance, to do so, in block 512, the compute device 100 performs a bitwise operation, such as an XOR operation, on the bit value and the scrambler pattern bit to achieve the scrambled result. In block 514, the compute device 100 writes the scrambled values to the respective column locations.

Figure 6:
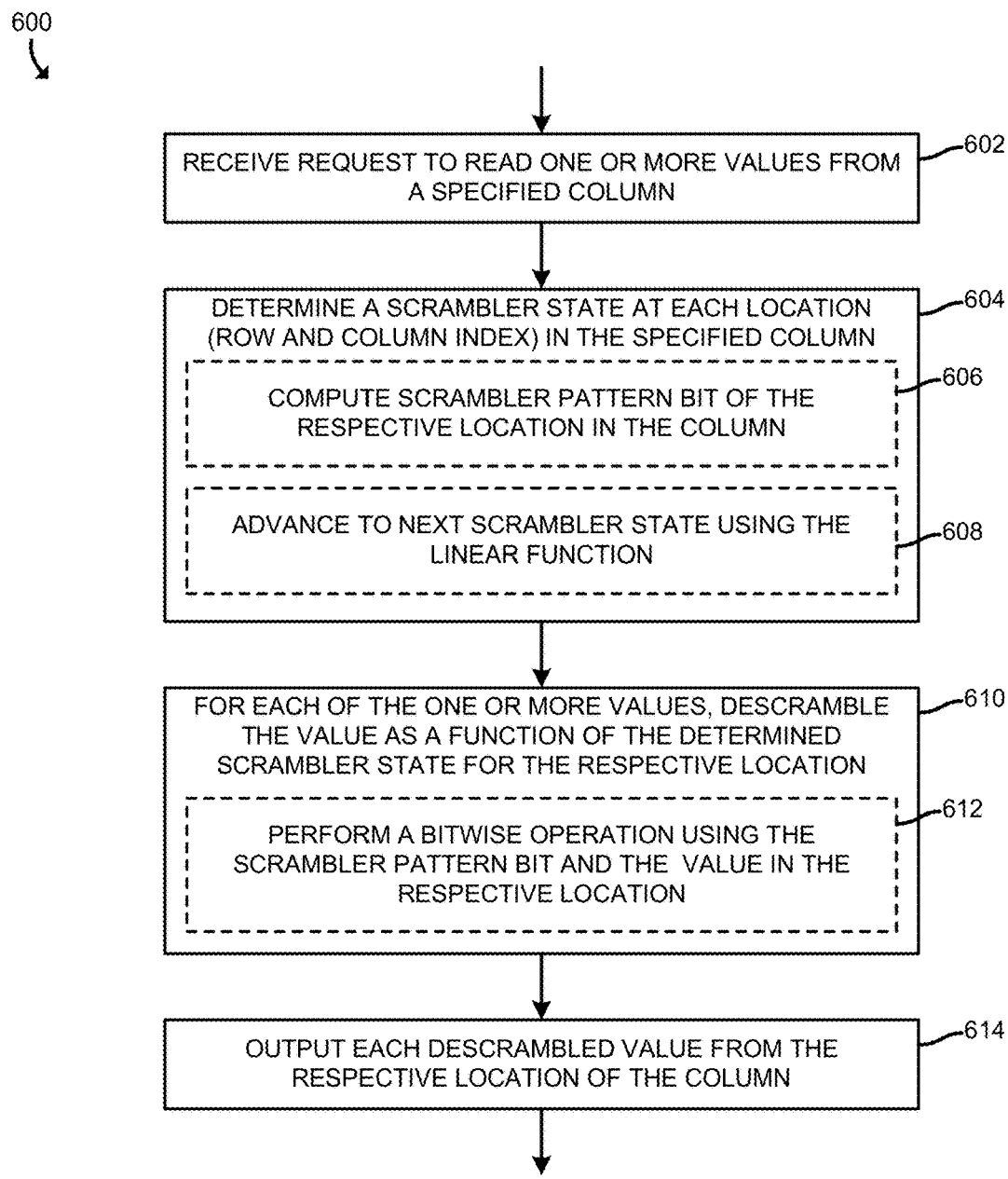
FIG. 6 is a flow diagram of at least one embodiment of a method for performing a scrambling function during a read operation by the compute device of FIG. 1.

Referring now to FIG. 6, a method 600 for performing a read operation on data written to a column in the memory media 110. For example, method 600 may occur in instances in which the compute device 100 receives a stochastic associative search request on a portion of data in the memory media 110. As shown, the method 600 begins in block 602, in which the compute device 100 receives a request to perform a read operation to read values from a specified column in the memory media 110.

In block 604, the compute device 100 determines a scrambler state at each location in the specified column. For instance, in block 606, the compute device 100 computes a pattern bit of the respective location in the column. And in block 608, the compute device 100 advances to the next scrambler state using the linear function. These steps may be carried out similar to that of blocks 504, 506, and 508 method 500. For example, to descramble a given column c, the compute device 100 jumps to an arbitrary state that is c steps from the starting LFSR state. More particularly, the compute device 100 calculates a S(0, c) by multiplying $A^c$ and S(0, 0). Thereafter, the compute device 100 traverses down the column by advancing the row offset, e.g., $A^k$, where k is some arbitrary positive integer. Where XOR gates can implement matrix A, similar logic may implement a multiplication by matrix $B=A^k$ for each bit in the column on successive rows. Such logic may be used to advance by k steps at a time to get a scrambler pattern for the column, where k is a positive integer.

In block 610, the compute device 100 descrambles, at each location, the value at the location as a function of the determined scrambler state for the respective location. Particularly, in block 612, the compute device 100 performs a bitwise operation using the scrambler pattern bit and the value in the respective location. The scrambler pattern bits are used in an XOR operation with the scrambled column data bits to recover the original data bits. In block 614, the compute device 100 outputs the descrambled values from each location of the column.

Note, although the techniques presented herein disclose column-based scrambling and descrambling, one of skill in the art will recognize that the embodiments described herein may also adapt row-based scrambling in a cross-point memory architecture. For example, in a situation in which a row-based scrambling or descrambling is to be performed, the compute device 100 determines a S(r, 0) by multiplying $A^r$ and S(0, 0), in which r corresponds to a given row index. Doing so allows the compute device 100 to traverse the row by advancing a column offset.

EXAMPLES

Illustrative examples of the technologies disclosed herein are provided below. An embodiment of the technologies may include any one or more, and any combination of, the examples described below.

Example 1 includes a device comprising a memory comprising a matrix storing individually addressable bit data, the matrix formed by a plurality of rows and a plurality of columns; circuitry connected to the memory, wherein the circuitry is to receive a request to perform a write operation of one or more bit values to one of the plurality of columns; determine a scrambler state at each location in the one of the plurality of columns, the location corresponding to a respective row and column index of the one of the plurality of columns and the scrambler state being indicative of a pattern used to determine a value at the respective column location; and scramble each of the bit values as a function of the scrambler state for the respective column location.

Example 2 includes the subject matter of Example 1, and wherein the circuitry is further to write the scrambled values to each respective column location.

Example 3 includes the subject matter of any of Examples 1 and 2, and wherein the circuitry is further to receive a request to perform a read operation on the one of the plurality of columns, the request specifying one or more locations in the one of the plurality of columns; determine the scrambler state at each specified location; descramble, as a function of the scrambler state, a bit value at each specified location; and output each bit value in response to the request.

Example 4 includes the subject matter of any of Examples 1-3, and wherein to determine the scrambler state at each location comprises to compute a pattern bit of the respective location of the row and column index.

Example 5 includes the subject matter of any of Examples 1-4, and wherein to compute the pattern bit of the respective location comprises to compute the pattern bit of the respective location using a function.

Example 6 includes the subject matter of any of Examples 1-5, and wherein to scramble each of the bit values comprises to perform a bitwise operation using the pattern bit and the bit value.

Example 7 includes the subject matter of any of Examples 1-6, and wherein to perform the bitwise operation comprises to perform an exclusive-OR operation using the pattern bit and the bit value as input.

Example 8 includes the subject matter of any of Examples 1-7, and wherein to determine the scrambler state comprises to advance to a scrambler state for a next location based on the linear function.

Example 9 includes the subject matter of any of Examples 1-8, and wherein the memory is of a three-dimensional crosspoint architecture.

Example 10 includes a system, comprising a processor; and a memory comprising a matrix storing individually addressable bit data, the matrix formed by a plurality of rows and a plurality of columns; circuitry connected to the memory, wherein the circuitry is to receive a request to perform a write operation of one or more bit values to one of the plurality of columns; determine a scrambler state at each location in the one of the plurality of columns, the location corresponding to a respective row and column index of the one of the plurality of columns and the scrambler state being indicative of a pattern used to determine a value at the respective column location; scramble each of the bit values as a function of the scrambler state for the respective column location; and write the scrambled values to each respective column location.

Example 11 includes the subject matter of Example 10, and wherein the circuitry is further to receive a request to perform a read operation on the one of the plurality of columns, the request specifying one or more locations in the one of the plurality of columns; determine the scrambler state at each specified location; descramble, as a function of the scrambler state, a bit value at each specified location; and output each bit value in response to the request.

Example 12 includes the subject matter of any of Examples 10 and 11, and wherein to determine the scrambler state at each location comprises to compute a pattern bit of the respective location using a linear function of the row and column index.

Example 13 includes the subject matter of any of Examples 10-12, and wherein to compute the pattern bit of the respective location using the linear function comprises to compute the pattern bit of the respective location using a Galois linear feedback shift register.

Example 14 includes the subject matter of any of Examples 10-13, and wherein to scramble each of the bit values comprises to perform a bitwise operation using the pattern bit and the bit value, and wherein to perform the bitwise operation comprises to perform an exclusive-OR operation using the pattern bit and the bit value as input.

Example 15 includes the subject matter of any of Examples 10-14, and wherein to determine the scrambler state comprises to advance to a scrambler state for a next location based on the linear function.

Example 16 includes the subject matter of any of Examples 10-15, and wherein the memory is of a three-dimensional crosspoint architecture.

Example 17 includes the subject matter of any of Examples 10-16, and wherein the memory is in a data storage device.

Example 18 includes the subject matter of any of Examples 10-17, and wherein the memory is in a memory device.

Example 19 includes a method comprising receiving, by a device having a memory, a request to perform a read operation to memory, wherein the memory comprises a matrix storing individually addressable bit data, wherein the matrix is formed by a plurality of rows and a plurality of columns, and wherein the read operation specifies to read one or more bit values from one of the plurality of columns; determining, by the device, a scrambler state at each location in the one of the plurality of columns, the location corresponding to a respective row and column index of the one of the plurality of columns and the scrambler state being indicative of a pattern used to determine a value at the respective column location; descrambling, by the device, each of the bit values as a function of the scrambler state for the respective column location; and reading, by the device, the descrambled values from each respective column location.

Example 20 includes the subject matter of Example 19, and wherein the memory is of a three-dimensional crosspoint architecture.

Example 21 includes one or more machine-readable storage media storing instructions, which, when executed on a processor, causes a device having a memory to receive a request to perform a read operation to memory, wherein the memory comprises a matrix storing individually addressable bit data, wherein the matrix is formed by a plurality of rows and a plurality of columns, and wherein the read operation specifies to read one or more bit values from one of the plurality of columns; determine a scrambler state at each location in the one of the plurality of columns, the location corresponding to a respective row and column index of the one of the plurality of columns and the scrambler state being indicative of a pattern used to determine a value at the respective column location; descramble each of the bit values as a function of the scrambler state for the respective column location; and read the descrambled values from each respective column location.

The invention claimed is:

1. A device comprising:
a memory comprising a matrix storing individually addressable bit data, the matrix formed by a plurality of rows and a plurality of columns;
circuitry connected to the memory, wherein the circuitry is implemented at least partly in one or more of configurable hardware circuitry or fixed-functionality hardware circuitry, wherein the circuitry as configured is to:
receive a request to perform a write operation of a plurality of bit values to one of the plurality of columns;
determine a scrambler state at each location in the one of the plurality of columns, the location corresponding to a respective row and column index of the one of the plurality of columns and the scrambler state being indicative of a pattern used to determine a value at the respective column location, wherein to determine the scrambler state at each location comprises to compute a pattern bit of the respective location of the row and column index using a linear function of the row and column index;
scramble each of the bit values as a function of the scrambler state for the respective column location; and
write the scrambled values to each respective column location in the one of the plurality of columns in one mode of operation.

2. The device of claim 1, wherein the circuitry as configured is further to location traverse down the one of the plurality of columns by advancing a row offset during the write operation in one mode of operation and traverse across one of a plurality of rows by advancing a column offset in a different mode of operation during a second write operation.

3. The device of claim 2, wherein the circuitry as configured is further to:
receive a request to perform a read operation on the one of the plurality of columns, the request specifying one or more locations in the one of the plurality of columns;
determine the scrambler state at each specified location;
descramble, as a function of the scrambler state, a bit value at each specified location; and
output each bit value in response to the request.

4. The device of claim 1, wherein to scramble each of the bit values comprises to perform a bitwise operation using the pattern bit and the bit value.

5. The device of claim 4, wherein to perform the bitwise operation comprises to perform an exclusive-OR operation using the pattern bit and the bit value as input.

6. The device of claim 1, wherein to determine the scrambler state comprises to advance to a scrambler state for a next location based on the linear function.

7. The device of claim 1, wherein the memory is of a three-dimensional crosspoint architecture.

8. A system, comprising:
a processor; and
a memory comprising a matrix storing individually addressable bit data, the matrix formed by a plurality of rows and a plurality of columns;
circuitry connected to the memory, wherein the circuitry is implemented at least partly in one or more of configurable hardware circuitry or fixed-functionality hardware circuitry, wherein the circuitry as configured is to:

receive a request to perform a write operation of a plurality of bit values to one of the plurality of columns;

determine a scrambler state at each location in the one of the plurality of columns, the location corresponding to a respective row and column index of the one of the plurality of columns and the scrambler state being indicative of a pattern used to determine a value at the respective column location, wherein to determine the scrambler state at each location comprises to compute a pattern bit of the respective location of the row and column index using a linear function of the row and column index;

scramble each of the bit values as a function of the scrambler state for the respective column location; and write the scrambled values to each respective column location in the one of the plurality of columns.

9. The system of claim 8, wherein the circuitry as configured is further to:

receive a request to perform a read operation on the one of the plurality of columns, the request specifying one or more locations in the one of the plurality of columns;

determine the scrambler state at each specified location;

descramble, as a function of the scrambler state, a bit value at each specified location; and output each bit value in response to the request.

10. The system of claim 8, wherein to compute the pattern bit of the respective location using the linear function comprises to compute the pattern bit of the respective location using a Galois linear feedback shift register.

11. The system of claim 8, wherein to scramble each of the bit values comprises to perform a bitwise operation using the pattern bit and the bit value, and wherein to perform the bitwise operation comprises to perform an exclusive-OR operation using the pattern bit and the bit value as input.

12. The system of claim 8, wherein to determine the scrambler state comprises to advance to a scrambler state for a next location based on the linear function.

13. The system of claim 8, wherein the memory is of a three-dimensional crosspoint architecture.

14. The system of claim 8, wherein the memory is in a data storage device.

15. The system of claim 8, wherein the memory is in a memory device.

16. A method comprising:

receiving, by a device having a memory, a request to perform a read operation to memory, wherein the memory comprises a matrix storing individually addressable bit data, wherein the matrix is formed by a plurality of rows and a plurality of columns, and wherein the read operation specifies to read a plurality of bit values from one of the plurality of columns;

determining, by the device, a scrambler state at each location in the one of the plurality of columns, the location corresponding to a respective row and column index of the one of the plurality of columns and the scrambler state being indicative of a pattern used to determine a value at the respective column location, wherein determining the scrambler state at each location comprises computing a pattern bit of the respective location of the row and column index using a linear function of the row and column index;

descrambling, by the device, each of the bit values as a function of the scrambler state for the respective column location; and reading, by the device, the descrambled values from each respective column location in the one of the plurality of columns.

17. The method of claim 16, wherein the memory is of a three-dimensional crosspoint architecture.

18. One or more machine-readable storage media storing instructions, which, when executed on a processor, causes a device having a memory to:

receive a request to perform a read operation to memory, wherein the memory comprises a matrix storing individually addressable bit data, wherein the matrix is formed by a plurality of rows and a plurality of columns, and wherein the read operation specifies to read a plurality of bit values from one of the plurality of columns;

determine a scrambler state at each location in the one of the plurality of columns, the location corresponding to a respective row and column index of the one of the plurality of columns and the scrambler state being indicative of a pattern used to determine a value at the respective column location, wherein to determine the scrambler state at each location comprises to compute a pattern bit of the respective location of the row and column index using a linear function of the row and column index;

descramble each of the bit values as a function of the scrambler state for the respective column location; and read the descrambled values from each respective column location in the one of the plurality of columns.

* * * * *